June 10, 1924.
Re. 15,856
A. VON AUW
PLUG HINGE FOR LOOSE LEAF BINDERS
Original Filed Oct. 25, 1922
Fig. 1.
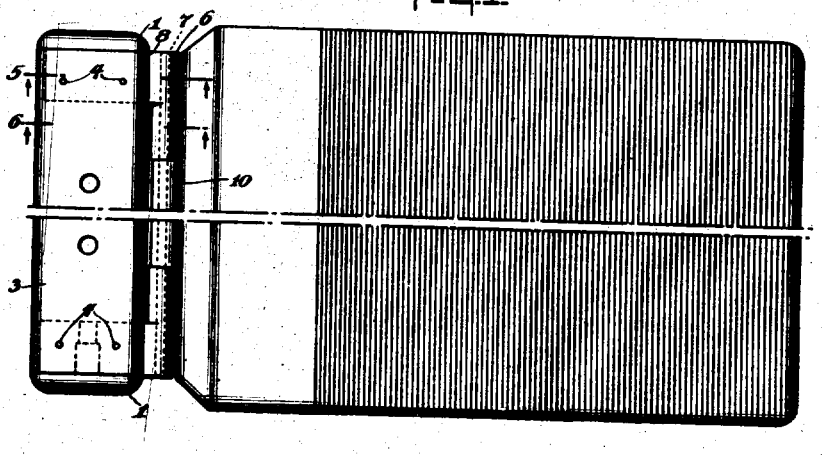
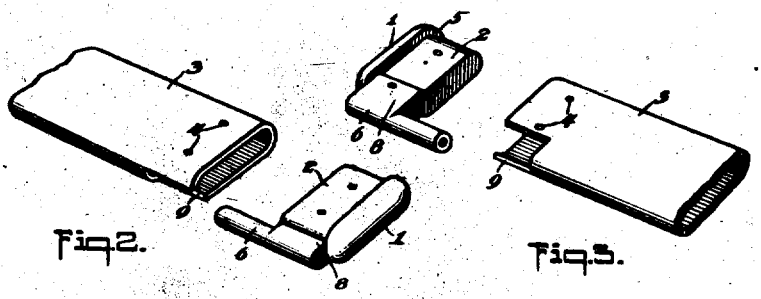
Fig. 2.
Fig. 3.
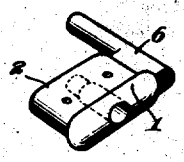
Fig. 4.
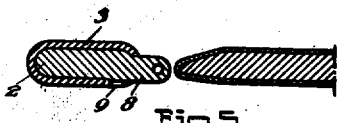
Fig. 5.
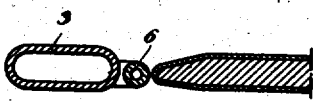
Fig. 6.
Inventor
*Alwin Von Auw*
By *Howson and Howson*
his Attorneys Reissued June 10, 1924. Re. 15,856

UNITED STATES PATENT OFFICE.

ALWIN VON AUW, OF BROOKLYN, NEW YORK, ASSIGNOR TO BOORUM & PEASE COMPANY, OF BROOKLYN, NEW YORK, A CORPORATION OF NEW YORK.

PLUG HINGE FOR LOOSE-LEAF BINDERS.

Original No. 1,474,866, dated November 20, 1923, Serial No. 596,766, filed October 25, 1922. Application for reissue filed April 9, 1924. Serial No. 705,265.

*To all whom it may concern:*

Be it known that I, ALWIN VON AUW, a citizen of the United States of America, and resident of the borough of Brooklyn, in the county of Kings and State of New York, have invented a certain new and useful Plug Hinge for Loose-Leaf Binders, of which the following is a specification.

My invention relates to loose leaf binders and more particularly to binders having hollow clamping bars.

One object of my invention is to provide a binder having only a few, simple parts, and one which consequently will be easy to manufacture. Another object is to reduce the number of machines, tools and parts necessary to manufacture a line of binders, by providing stock parts which can be used for different sizes and styles of binders. Another object of my invention is to provide a binder having a strong cover hinge.

In the drawings:

Fig. 1 is a partial plan view of the top cover and clamping member of a loose leaf post binder embodying my invention;

Fig. 2 is a perspective view of one end of the clamping bar with my unitary cap hinge ready for insertion;

Fig. 3 is an inverted perspective view of the same parts from another angle;

Fig. 4 is a perspective view of one form of plug-hinge for the end of the tube opposite to that shown in Figs. 2 and 3;

Fig. 5 is a section on line 5—5 of Fig. 1;

Fig. 6 is a section on line 6—6 of Fig. 1.

In many types of loose leaf binders there are clamping bars to hold the sheets in the binder together, and the covers are hinged to them.

These clamping bars are generally hollow tubes and have hinge knuckles formed on them as integral parts. These members are usually stamped out from a die and then bent into shape, a separate die being required for each arrangement and style of tube and hinge. The alternate knuckles are formed on the cover and the tube, and the parts fastened together by a pin inserted through the alternated knuckles. The ends of the tube are closed by plug caps.

My invention eliminates the necessity for the elaborate dies which have been required for different sizes and styles of binder by having one single member act both as end hinge and as plug cap as hereinafter described.

In my device the end plug of the tube and the hinge knuckle of the tube are combined in a unitary plug hinge member 1. The plug portion 2 of this member 1 is adapted to fit into the end of a clamping bar or tube 3 and can be held in position by any suitable fastening means, such for example, as pins 4, passing through the tube and plug from one side to the other. The outer end of the plug hinge member 1 has a flange 5 bearing against the end of the tube.

Along one side of the plug portion 2 is a hinge knuckle or sleeve portion 6 bored to receive a hinge pin 7. A web 8 joins the hinge portion directly to the part of the plug portion adapted to fit inside the tube. The tube 3 is cut away on one side, as by slot 9 sufficiently to permit the web 8 to project through the tube when the plug is in position. This web 8 preferably reaches to the full depth of the plug portion though it can be partly cut away if desired. I prefer to make the plug, hinge and web portion of the member 1 out of one solid piece, though by the phrase "one-piece" I mean to include both integral structures and those built up into a unitary structure from several pieces. I prefer to offset the web portion slightly toward the surface of the tube 3 which is next the sheets, in order to permit the cover to lie snugly against the sheets. This offsetting is seen most clearly in Fig. 5.

One of these plug-hinge members is fastened in each end of the tube 3, and on the cover is a hinge knuckle or sleeve 10 reaching between the sleeve portions 6 of the two plug-hinges in the end of the tube. The pin 7 is passed through the three sleeves to fasten the tube and cover together.

The depth of the part of the plug portion fitting in the tube may be less than the length of the hinge portion—as shown in the drawings, so that the hinge portion extends along the tube further than the plug portion, or, if desired, the plug portion may extend further than the hinge portion. It should also be understood that the plug hinge may be of any desired shape—such for instance as that shown in the application for loose leaf binder, Serial No. 596,344, filed October 23, 1922, by myself and Charles A. Finley. Various other modifications will occur to those skilled in the art which do not depart from the essence of my invention.

A manufacturer using my construction can eliminate all the dies formerly required to stamp out the various tubes by carrying long strips of tubing and cutting to length as required. The combined end plug and hinge, whether made with all its parts integral or of several pieces fastened together as a unitary device, is not only easy to manufacture, and strong, but the appearance and strength of a binder embodying it is superior to those now on the market.

What I claim is:—

1. In a loose leaf binder, a hollow member, a one-piece end plug and hinge member fitting in said hollow member and projecting through one side thereof.

2. In a loose leaf binder having a clamping member in the form of a tube, a one-piece member having an end plug portion inserted in the end of the tube and a hinge portion directly united to the end plug portion through an opening in the wall of the tube.

3. In a loose leaf binder having a clamping member in the form of a tube, a one-piece member having an end plug portion inserted in the end of the tube and a hinge portion directly united to the end plug portion through an opening in the wall of the tube, said union of the end plug and hinge portions extending the full depth of the insertion part of said end plug portion.

4. In a loose leaf binder, a clamping bar having a slot at its end, in combination with a one-piece member comprising a plug portion, a hinge portion and a web portion uniting said other portions and projecting through the slot in said clamping bar.

5. In a loose leaf binder, a clamping bar having a slot at its end, in combination with a one-piece member comprising a plug portion, a hinge portion and a web portion uniting said other portions and projecting through the slot in said clamping bar, said one-piece member being bored to permit access to the interior of said clamping bar.

6. In a loose leaf binder, a hollow clamping bar having a slot in the end thereof, in combination with a combined plug and hinge member fitting in the end of the bar and having a part which projects through said slot.

ALWIN VON AUW.